Figure 1:
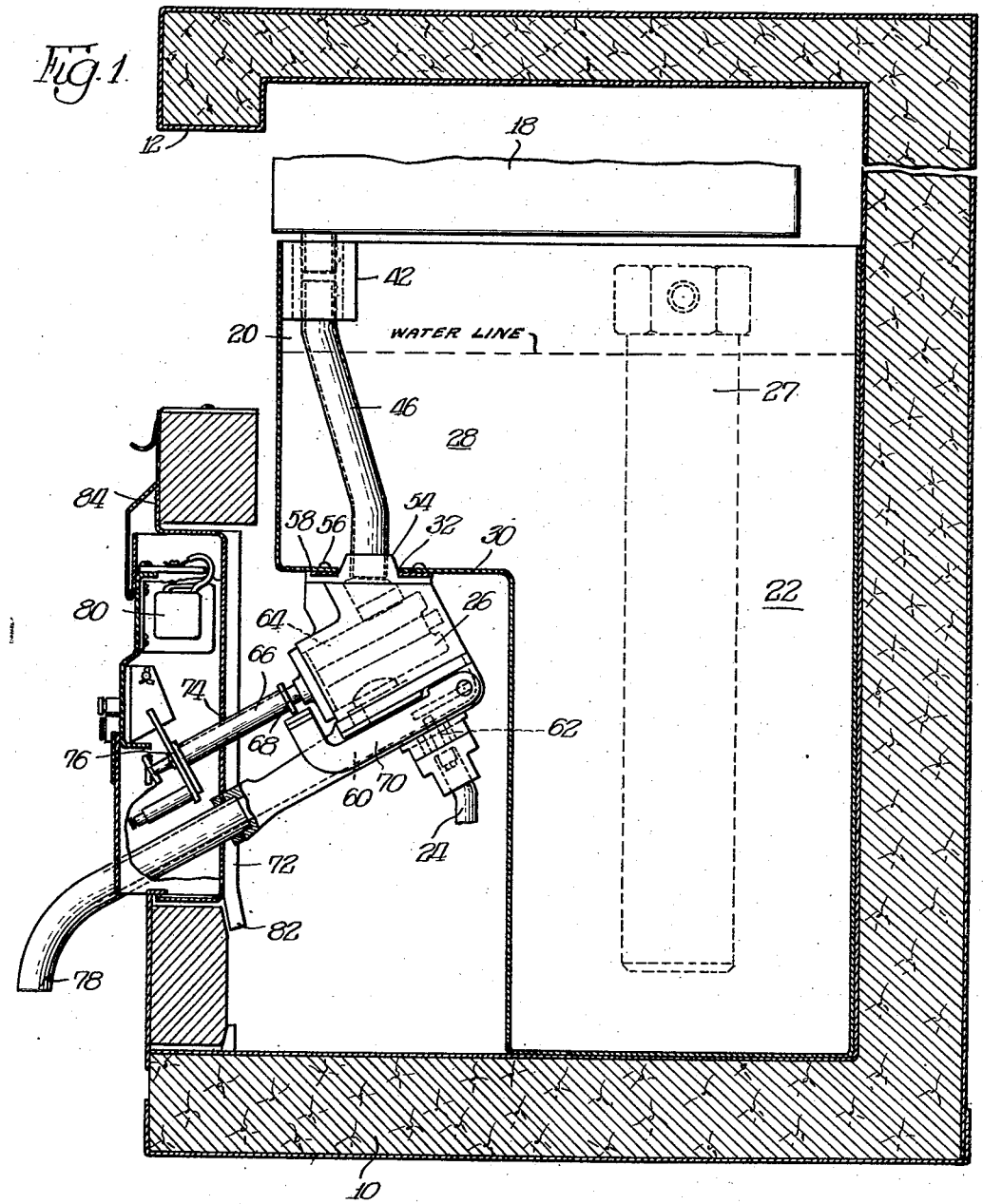

July 4, 1944.   W. E. RICHMOND   2,353,080
REFRIGERATED BEVERAGE MIXING ASSEMBLY
Filed Aug. 3, 1940   2 Sheets-Sheet 1

INVENTORS
William E. Richmond
BY
attys.

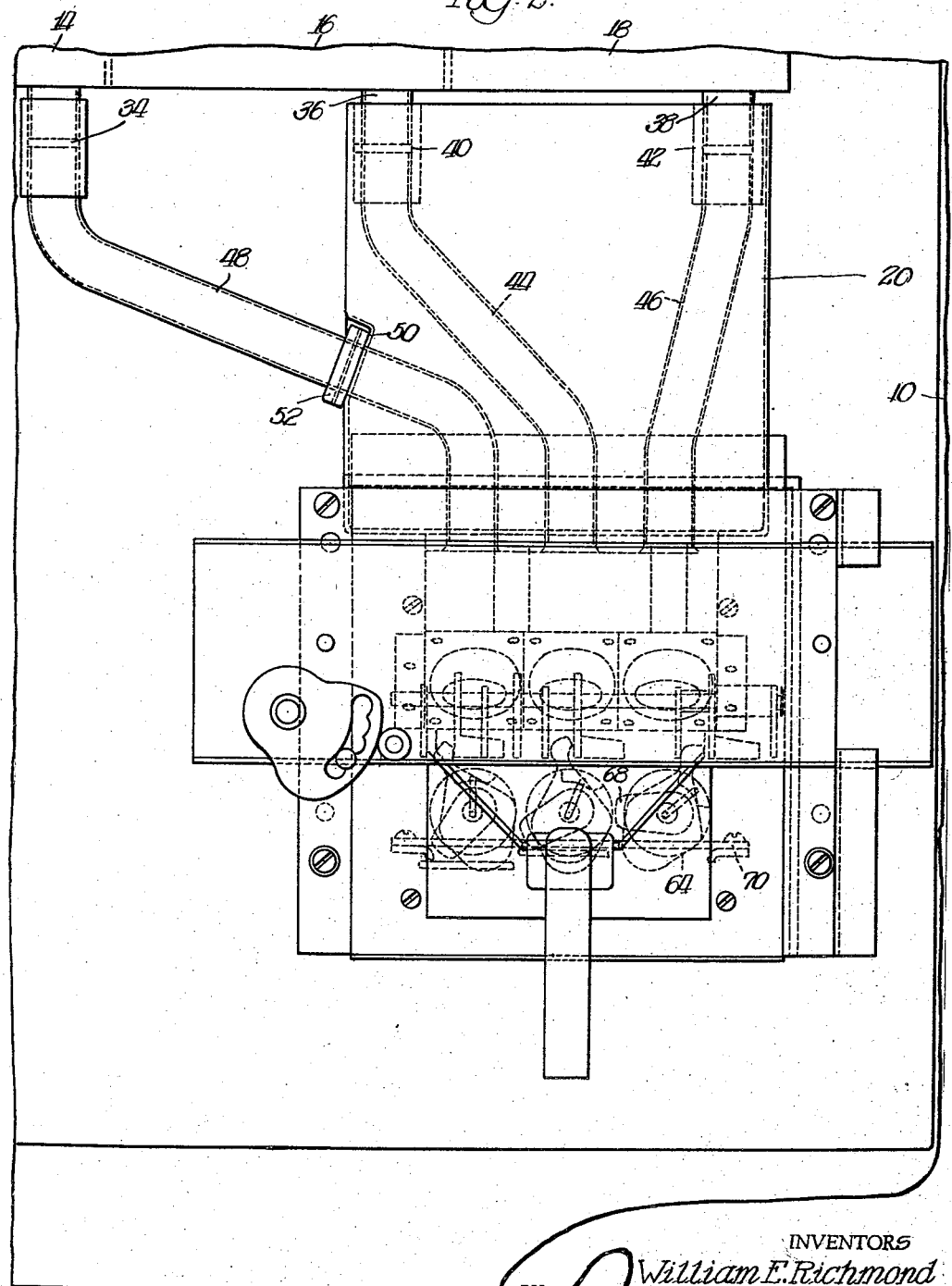

Patented July 4, 1944

2,353,080

UNITED STATES PATENT OFFICE 2,353,080

REFRIGERATED BEVERAGE MIXING ASSEMBLY

William E. Richmond, Kenilworth, Ill., assignor to Automatic Canteen Company of America, Chicago, Ill., a corporation of Delaware Application August 3, 1940, Serial No. 350,908

3 Claims. (Cl. 225—21)

This invention relates to improvements in refrigerated beverage mixing assemblies and is for use particularly in connection with machines for vending carbonated drinks in bulk form.

The broad object of this invention is to refrigerate the mixing assembly and ingredient supply lines of a carbonated liquid vending machine in order to increase carbonation of a beverage delivered to a cup and to assure each drink's being satisfactorily cool. In the past it has been common practice in designing beverage machines which mix a syrup with carbonated water to cool the carbonated water and the syrup and then deliver these two ingredients to an uncooled mixing assembly. Inasmuch as the average drink contains only five or six ounces of fluid, the uncooled mixing assembly on a warm day will introduce considerable heat to the beverage before it can be delivered to a cup for consumption by a customer. The resulting undesirably high temperature of the beverage impairs its palatability in two ways: the warmed beverage itself is not as cooling as the customer desires and the increased temperature assists in the escape of the carbon dioxide gas from the beverage because the solubility of carbon dioxide in water decreases as the temperature of the water rises.

A feature of this invention is the disposition of a mixing assembly for syrup and carbonated water in the lower part of an insulated chamber which is maintained at a desired low temperature. It is, of course, necessary to provide means for operating the mixing assembly from a point outside of the insulated cabinet and it is further necessary to deliver the beverage mixed in the assembly to a cup outside the insulated cabinet. Toward these ends provision is made for operating a compact mixing unit by rotational movement of a shaft or shafts which project through the insulated wall of the cabinet. By means of these rotating shafts as contrasted to other types of lever trains, the space between the shafts and the insulated wall of the cabinet may be maintained at a minimum so that there will be little transfer of heat by convection.

As will appear in the disclosure below, the mixing assembly disclosed in the embodiment of this invention shown in the drawings is for a selective drink vending machine and hence provides means for mixing one of a plurality of syrups with carbonated water. Such a mixing assembly necessarily has at least one external control for each beverage to be vended and the principle of utilizing a rotatable shaft passed through the insulated wall of the cabinet is very advantageous in that the rotatable shafts permit close mounting so as to require only a small opening through a cabinet wall.

A further object of this invention is to assure a uniformly low temperature of carbonated water, syrup and the mixing assembly in order that the temperature of any one of these will not be modified by a different temperature of another. In the vending machine to which applicant's device is applied, a single insulated cabinet is utilized for the purpose of cooling the syrup tanks and the carbonated water. As a matter of practice the syrup tanks are located in the upper part of the insulated cabinet while the means for cooling the carbonated water is located in the lower portion thereof. Temperature inside the insulated cabinet ordinarily varies and the syrup in the upper part of the insulated cabinet may be ten or more degrees warmer than the carbonated water and the mixing assembly disposed in the lower part. These syrup tanks are connected by suitable tubing to the mixing assembly and if drinks were drawn at infrequent intervals, the temperature of the syrup would drop as the syrup reached a lower position in the cabinet with the result that the syrup, the carbonated water and the mixing assembly would be at approximately a common temperature at the time of mixing. However, vending machines have heavy load periods and during these periods the syrup descends from the tank at the top of the insulated cabinet to the mixing assembly too rapidly to be lowered to the temperature of the mixing assembly and of the carbonated water by ordinary means. One of the features of this invention contributing toward this object is the interposition of a flash cooling chamber between the syrup tanks and the mixing assembly. This chamber is provided with means for rapid cooling and in the particular embodiment shown in the drawings, is part of a flash cooler utilizer to maintain the carbonated water at a predetermined low temperature regardless of load volume.

Incidental to the foregoing object is the desire to cool quickly and maintain only a limited quantity of a syrup at drink temperature so that after a refilling of a syrup tank a drink at the desired temperature may be drawn immediately from the vending machine. In applicant's structure, the syrup tanks are not immersed in the water of the cooler but are supported above with a drain duct from each syrup tank through the water of the cooler to the mixing assembly.

By this arrangement only the syrup in the duct, a comparatively small amount, need be brought to the temperature of the beverage in order to permit the draining of a drink. As the addition of syrup to the tank does does not raise the temperature of any remaining syrup in the duct, a refilling of the tank does not interfere with continuous operation of the machine. Contrast this highly desirable result with a construction which immerses the syrup tank in the cooler whereby the filling of the tank with syrup at room temperature immediately raises the temperature of any cooled syrup remaining in the tank and renders the machine incapable of vending a cold drink for a matter of one or two hours while the refrigerating mechanism is bringing down the temperature of all of the syrup in the tank to the desired drink temperature.

Another object of this invention is to assure accessibility to the mixing assembly because cleaning this assembly at regular intervals is desirable and in case of a breakdown it is desirable that it may be readily removed from the inside of the cabinet without disconnecting refrigerant lines or cooling coils. A feature contributing toward this end is the employment of a removable insulated panel through which the mixing assembly controls and the delivery spout project. This panel may be readily removed and the opening is sufficiently great to permit the mixing assembly to be disconnected from its mounting in the cabinet.

These and such other objects as may hereinafter appear are attained in one embodiment of the invention shown in the accompanying drawings, in which:

Figure 1 is a view partly in section and partly in elevation of a mixing assembly disposed inside an insulated chamber; and Figure 2 is a front view of the structure shown in Figure 1.

Continuing to refer to the drawings, particularly Figure 1, the numeral 10 identifies an insulated cabinet having a door opening 12 by means of which access may be had to a plurality of syrup tanks 14, 16 and 18, only the bottom of which are shown, see Figure 2. Disposed beneath the syrup tanks is a flash cooler 20, which has an inverted L cross-section, see Figure 1. The main portion 22 of the flash cooler 20, which contains a liquid heat transfer medium, houses a carbonating apparatus 27 which is diagrammatically indicated and which delivers carbonated water to the tube 24 into the mixing assembly generally identified by the numeral 26. The forward portion 28 of the flash cooler 20 has a bottom wall 30 in which is cut a plurality of circular openings 32. In the upper portion of the flash cooler two of the syrup tanks, 16 and 18, having drain pipes 36 and 38, are, referring to Figure 2, coupled by collars such as 40 and 42 to drain ducts 44 and 46. The syrup tank 14 drains through tube 48 which is connected thereto by coupling 34. In order to pass drain pipe 48 through the flash cooler 20, which occupies only the right hand lower portion of the insulated cabinet 10, it is necessary to cut an opening 50 in the side wall of the flash chamber 20 and pass the tube 48 through a suitable sealing element 52. Referring to Figure 1, it will be observed that the tubes, such as 46, terminate in a dye casting 54 which is fastened to the bottom 30 of the forward portion 28 of the flash cooler 20 by means of screws, such as 56, with a gasket 58 for the purpose of preventing seepage of liquid from the flash tank around the openings such as 32. The tubes 44, 46 and 48 may be sweated into the casting 54 and to the couplings such as 42 in order to assure a liquid tight seal.

Summarizing at this point, as shown in the particular embodiment described, the invention comprises passing syrup from tanks above through a flash cooler 20 to a mixing assembly 26 below. By this arrangement it is possible to introduce all of the ingredients of a carbonated drink to the mixing chamber 60 at approximately the same temperature as the metal in that mixing assembly. This is true even under conditions of almost continuous operation. It will be appreciated that the shape of the flash cooler 20 or the particular means of mounting the mixing assembly 26 thereon do not detract from the broad aspects of the invention. Passing the syrup through a flash cooler could be done in a variety of other ways and by a variety of other structures. It will further be noted that a single flash cooler is employed for both the carbonating apparatus and the syrup tubes. As used herein the term "flash cooler" refers to a cooling unit of definitely high capacity. More specifically, the term identifies a cooling unit capable of maintaining carbonated water at a selected temperature during peak load periods of a vending machine.

Examining now certain features permitting easy control of the mixing assembly from the exterior of the cabinet without permitting excess transmission of heat to a point within the cabinet, referring to Figure 1, the mixing assembly 26 consists of a mixing chamber 60 with a carbonated water valve 62 and a syrup measuring valve 64. The syrup measuring valve is controlled by a rotatable shaft 66 having on it a cam member 68 which through a link 70 operates the carbonated water valve 62. By rotating the shaft 66, the syrup measuring chamber 64 will empty by gravity into the mixing chamber 60 simultaneously with the introduction of a selected quantity of carbonated water through the carbonated water valve 62, the shaft 66 being held in actuated position for a selected period of time.

As may be seen in Figure 2, three syrup measuring chambers such as 64 are mounted side by side and the mixing chamber 60 extends across the bottom of all three so that a single carbonated water supply 24 may be used. The means for operating any one of the shafts, such as 66, and the like may be studied in the application of John W. Carlson, Serial No. 301,528, filed October 27, 1939, or of Ernest H. Thompson and Leo W. Doggett, Serial No. 319,224, filed February 16, 1940, and is not pertinent in this invention. Suffice it to say, where a rotatable shaft such as 66 is passed through a removable insulated wall 72, the clearance at 74, see Figure 1, between the shaft 66 and the insulated wall 72 may be very small. The driving elements 76 are affixed to the shaft 66 after the mixing assembly 26 and the insulated removable wall 72 have been placed in position. Similarly, the spout 78 projects through the insulated wall 72 so as to permit a minimum penetration of heat into the cabinet.

The other elements generally indicated by the numeral 80 in Figure 1 are solenoids mounted on a carriage suspended on the outside of the cabinet. This carriage must be removed before access to the removable wall member 72 may be had.

The removable wall member 72 does not support the mixing assembly in the embodiment shown here although it is evident that in case a different type of coupling between the syrup tanks and the mixing assembly were used, it would be feasible to support the mixing assembly on this door. By removing the door 72, the mixing assembly could be removed at the same time. The removable door 72 has a depending flange 82 which is engaged in the inside wall of the cabinet 10 and is held above at 84 by any suitable means.

Having thus described my invention, what we claim as new and desire to secure by Letters Patent of the United States, is:

1. In a beverage vending machine for mixing and vending cold drinks, an insulated cabinet, a container for a liquid hold-over bath in said cabinet adapted to cool the space within said cabinet, a mixing assembly for mixing a syrup with a second liquid to form a beverage, said mixing assembly being disposed in a lower part of the space within said cabinet outside of but partially surrounded by the container for said hold-over bath, a syrup tank in the upper part of the space within said cabinet outside of said hold-over bath, a conduit passing through the hold-over bath connecting said syrup tank to said mixing assembly, and means for cooling said second liquid in said hold-over bath and passing it to said mixing assembly.

2. In a beverage vending machine for mixing and vending cold drinks, an insulated cabinet, a container for a liquid hold-over bath in said cabinet adapted to cool the space within said cabinet, said container having an inverted L shape, a mixing assembly disposed beneath the base of said L and to one side of the stem of said L, a syrup reservoir above the base of said L, and a conduit passing from said syrup reservoir through the portion of the hold-over bath contained in the base of said L to said mixing assembly.

3. In a beverage vending machine for mixing and vending cold drinks, an insulated cabinet, a container for a liquid hold-over bath in said cabinet adapted to cool the space within said cabinet, said container having an inverted L shape, a mixing assembly for mixing the syrup with a second liquid to form a beverage, said mixing assembly being disposed in a lower part of the space within said cabinet outside of but partially surrounded by said inverted L-shaped container, a syrup reservoir within said insulated cabinet subject to the cooling influence of the atmosphere therein but outside of said hold-over bath, a conduit from said syrup reservoir to said mixing assembly, means for cooling a limited quantity of syrup in said conduit in the hold-over bath contained in the base of said inverted L-shaped container, means for cooling said second liquid in the hold-over bath contained in the stem of said inverted L-shaped container, and means for passing said cooled second liquid to said mixing assembly.

WILLIAM E. RICHMOND.